US009235616B2

United States Patent
Wu et al.

(10) Patent No.: US 9,235,616 B2
(45) Date of Patent: Jan. 12, 2016

(54) SYSTEMS AND METHODS FOR PARTIAL WORKFLOW MATCHING

(71) Applicant: XEROX CORPORATION, Norwalk, CT (US)

(72) Inventors: Changjun Wu, Rochester, NY (US); Hua Liu, Fairport, NY (US)

(73) Assignee: XEROX CORPORATION, Norwalk, CT (US)

(*) Notice: Subject to any disclaimer, the term of this patent is extended or adjusted under 35 U.S.C. 154(b) by 366 days.

(21) Appl. No.: 13/855,477

(22) Filed: Apr. 2, 2013

(65) Prior Publication Data

US 2014/0297662 A1   Oct. 2, 2014

(51) Int. Cl.
 G06F 17/30 (2006.01)
(52) U.S. Cl.
 CPC ............... G06F 17/30424 (2013.01)
(58) Field of Classification Search
 CPC .................................................. G06F 17/30424
 See application file for complete search history.

(56) References Cited

U.S. PATENT DOCUMENTS

| | | | | |
|---|---|---|---|---|
| 5,960,404 A | * | 9/1999 | Chaar et al. | 705/7.26 |
| 2005/0071209 A1 | * | 3/2005 | Tatavu et al. | 705/7 |
| 2006/0031095 A1 | * | 2/2006 | Barth et al. | 705/2 |
| 2010/0325054 A1 | * | 12/2010 | Currie et al. | 705/301 |
| 2013/0166703 A1 | * | 6/2013 | Hammer et al. | 709/220 |

OTHER PUBLICATIONS

Davidson, Susan et al., "Keyword Search in Workflow Repositories with Access Control", May 1, 2011, pp. 1-14.*
Awatef Hicheur et al., "Modelling Collaborative Workflows Using Recursive ECATNets", Jun. 23, 2008, pp. 274-284.*
Marsha Chechik et al., "PWWM: A Personal Web Workflow Methodology", 2013, pp. 1-38.*
Sarah Cohen-Boulakia et al., "Search, Adapt, and Reuse: The Future of Scientific Workflows", Jun. 2011, pp. 6-16.*
Ralph Bergmann et al., "Similarity Assessment and Ecient Retrieval of Semantic Workflows", Sep. 29, 2012, pp. 1-27.*
Anand Kulkarni et al., "Turkomatic: Automatic Recursive Task and Workflow Design for Mechanical Turk", May 7, 2011, pp. 1-6.*
Dickson K.W. Chiu et al., "A Meta Modeling Approach to Workflow Management Systems Supporting Exception Handling", 1999, Information Systems, vol. 24, No. 2, pp. 159-184.*
Yolanda Gil et al., "Workflow Matching Using Semantic Metadata", Sep. 1, 2004, ACM, pp. 1-8.*

* cited by examiner

*Primary Examiner* — Apu Mofiz
*Assistant Examiner* — Jared Bibbee
(74) *Attorney, Agent, or Firm* — MH2 Technology Law Group LLP (57) ABSTRACT

The present invention generally relates to systems and methods for identifying a workflow, from a set of workflows, that best match a given query partial workflow. In addition to identifying the best match, the systems and methods can identify the portion of the workflow that best matches the query partial workflow.

18 Claims, 7 Drawing Sheets

SYSTEMS AND METHODS FOR PARTIAL WORKFLOW MATCHING

FIELD OF THE INVENTION

This invention relates generally to comparing workflows for similarity.

BACKGROUND OF THE INVENTION

Workflows can model real-world tasks and transitions between tasks. Comparing partial workflows to large sets of complete workflows can be a computationally intensive task.

SUMMARY

According to an embodiment, a method of matching a partial workflow is presented. The method includes obtaining a query partial workflow including a plurality of tasks and a plurality of operations, obtaining a plurality of workflows, each workflow including a plurality of tasks and a plurality of operations, decomposing each of the plurality of workflows into a plurality of components, each component including a plurality of tasks, such that a plurality of decomposed workflows are obtained, filtering the plurality of workflows based on the decomposed workflows and a decomposition of the query partial workflow, such that a plurality of filtered workflows are obtained, sequencing the plurality of filtered workflows, such that a plurality of sequenced filtered workflows are obtained, matching the query partial workflow to each of the plurality of sequenced filtered workflows, each matching based on a corresponding plurality of recursively determined scores, such that scores for each of the plurality of sequenced filtered workflows are obtained, identifying, from among the plurality of workflows, a matched workflow corresponding to an extremum among the scores for each of the plurality of sequenced filtered workflows, and providing the matched workflow.

Various optional features of the above method include the following. The plurality of components can include split components, merge components, and path components. The method can include detecting a duplicative partial workflow based on the providing. The method can include recommending a pre-existing partial workflow based on the providing. The filtering can include removing from consideration workflows from the plurality of workflows that do not include at least one component of the decomposition of the query partial workflow. Each matching can include generating a matrix comprising the corresponding plurality of recursively determined scores. Each matrix can include path information for each of the recursively determined scores. The method can further include identifying, based on path information, a partial workflow of the matched workflow that matches the query partial workflow. The method can further include backtracking recursively determined scores from the extremum among the scores. The method can further include identifying, based on backtracking, a partial workflow of the matched workflow that matches the query partial workflow.

According to an embodiment, a system for matching a partial workflow is presented. The system includes a memory storing a query partial workflow including a plurality of tasks and a plurality of operations, a memory storing a plurality of workflows, each workflow including a plurality of tasks and a plurality of operations, at least one processor configured to decompose each of the plurality of workflows into a plurality of components, each component including a plurality of tasks, such that a plurality of decomposed workflows are obtained, at least one processor configured to filter the plurality of workflows based on the decomposed workflows and a decomposition of the query partial workflow, such that a plurality of filtered workflows are obtained, at least one processor configured to sequence the plurality of filtered workflows, such that a plurality of sequenced filtered workflows are obtained, at least one processor configured to match the query partial workflow to each of the plurality of sequenced filtered workflows, each matching based on a corresponding plurality of recursively determined scores, such that scores for each of the plurality of sequenced filtered workflows are obtained, at least one processor configured to identify, from among the plurality of workflows, a matched workflow corresponding to an extremum among the scores for each of the plurality of sequenced filtered workflows, and at least on processor configured to provide an identification of the matched workflow.

Various optional features of the above system include the following. The plurality of components can include split components, merge components, and path components. The system can include at least one processor configured to detect a duplicative partial workflow based on the matched workflow. The system can include at least one processor configured to recommend a pre-existing partial workflow based on the matched workflow. The at least one processor configured to filter can be further configured to remove from consideration workflows from the plurality of workflows that do not include at least one component of the decomposition of the query partial workflow. The system can include at least one processor configured to generate a matrix comprising the corresponding plurality of recursively determined scores. The system can include a memory configured to store a representation of each matrix including path information for each of the recursively determined scores. The system can include at least one processor configured to identify, based on path information, a partial workflow of the matched workflow that matches the query partial workflow. The system can include at least one processor configured to backtrack recursively determined scores from the extremum among the scores. The system can include at least one processor configured to identify, based on backtracking, a partial workflow of the matched workflow that matches the query partial workflow.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Workflows model rear-world tasks and the transitions between them. For example, a workflow can model constructing a building, paying employees, purchasing items online, etc. Large enterprises typically include many different, and possibly related, workflows. For example, a partial workflow can appear in several different complete workflows, such as a payment transfer workflow appearing in both an online auction workflow and an online bill payment workflow.

In general, a workflow can be conceptualized as a finite set of activities, or "tasks", paired with a finite set of operations. The set of operations includes transitions between two tasks (e.g., "paths"), "splits" from one task to two or more tasks, and joins (a.k.a. "merges") from two or more tasks to one task. The operations can be considered as transitions or flows from one (or more) tasks to one (or more) tasks.

Comparing a partial workflow (referred to herein as a "query partial workflow") to each workflow in a large set of workflows for similarity can be computationally expensive. For example, one way to do so is to use brute-force pairwise comparisons between the query partial workflow and every partial workflow of each workflow in the set. Another comparison technique, detecting sub-graph isomorphism between arbitrary workflows, is an NP-complete problem, which is considered intractable in its full generality case.

Embodiments of the present invention can be used to match a query partial workflow to a set of workflows. More particularly, embodiments can be used to determine a workflow from a set of workflows that includes a partial workflow that is most similar to a given query partial workflow. Some embodiments accomplish this by first filtering out workflows that have a small chance of matching, and then assigning a score to each remaining workflow in relation to the query workflow. This process is detailed below in reference to the figures.

Matching a query partial workflow to each of a set of workflows has many applications. For example, a business analyst can identify duplicative partial workflows. When such duplication is detected, the business analyst can remove the redundant work, or merge the processes so as to avoid duplication. As another example, a business analyst can detect similar partial workflows among two or more workflows and suggest using a common partial workflow so as to promote efficiency. Other applications of partial workflow matching are also contemplated.

Figure 1:
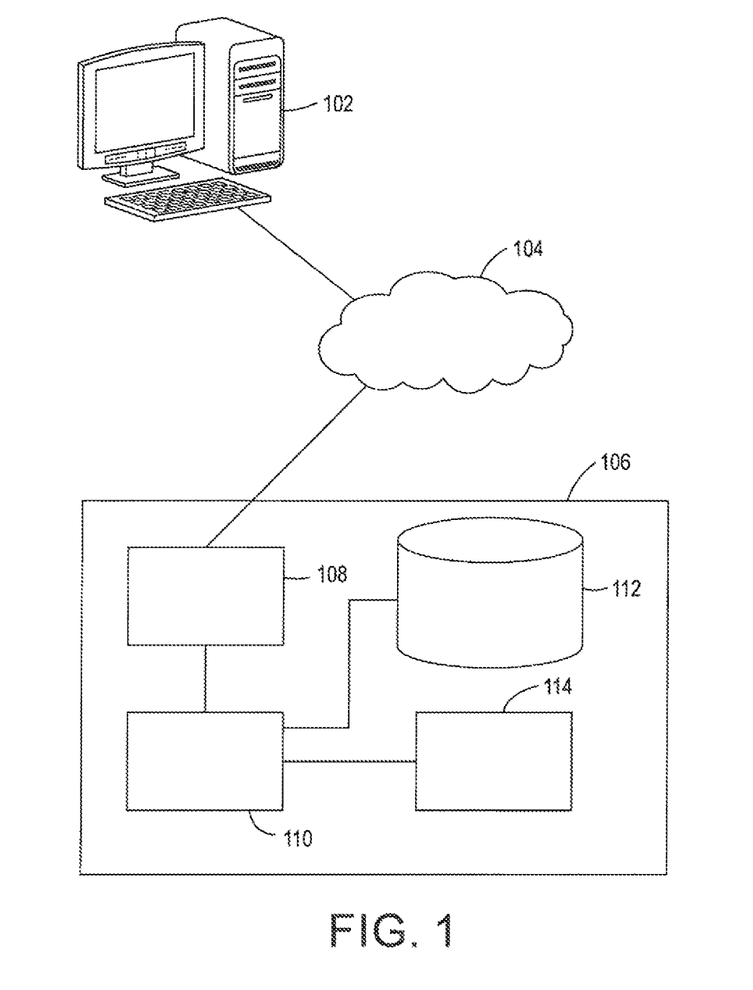
FIG. 1 is a schematic diagram of a system according to some embodiments.

FIG. 1 is a schematic diagram of a system according to some embodiments. In particular, FIG. 1 illustrates various hardware, software, and other resources that may be used in implementations of computer system 106 according to disclosed systems and methods. In embodiments as shown, computer system 106 may include one or more processors 110 coupled to random access memory operating under control of or in conjunction with an operating system. The processors 110 in embodiments may be included in one or more servers, clusters, or other computers or hardware resources, or may be implemented using cloud-based resources. The operating system may be, for example, a distribution of the Linux™ operating system, the Unix™ operating system, or other open-source or proprietary operating system or platform. Processors 110 may communicate with data store 112, such as a database stored on a hard drive or drive array, to access or store program instructions other data.

Processors 110 may further communicate via a network interface 108, which in turn may communicate via the one or more networks 104, such as the Internet or other public or private networks, such that a query or other request may be received from client 102, or other device or service. Additionally, processors 10 may utilize network interface 108 to send information, instructions, workflows query partial workflows, or other data to a user via the one or more networks 104. Network interface 104 may include or be communicatively coupled to one or more servers. Client 102 may be, e.g., a personal computer coupled to the internet.

Processors 110 may, in general, be programmed or configured to execute control logic and control operations to implement methods disclosed herein. Processors 110 may be further communicatively coupled (i.e. coupled by way of a communication channel) to co-processors 114. Co-processors 114 can be dedicated hardware and/or firmware components configured to execute the methods disclosed herein. Thus, the methods disclosed herein can be executed by processor 110 and/or co-processors 114.

Other configurations of computer system 106, associated network connections, and other hardware, software, and service resources are possible.

Figure 2:
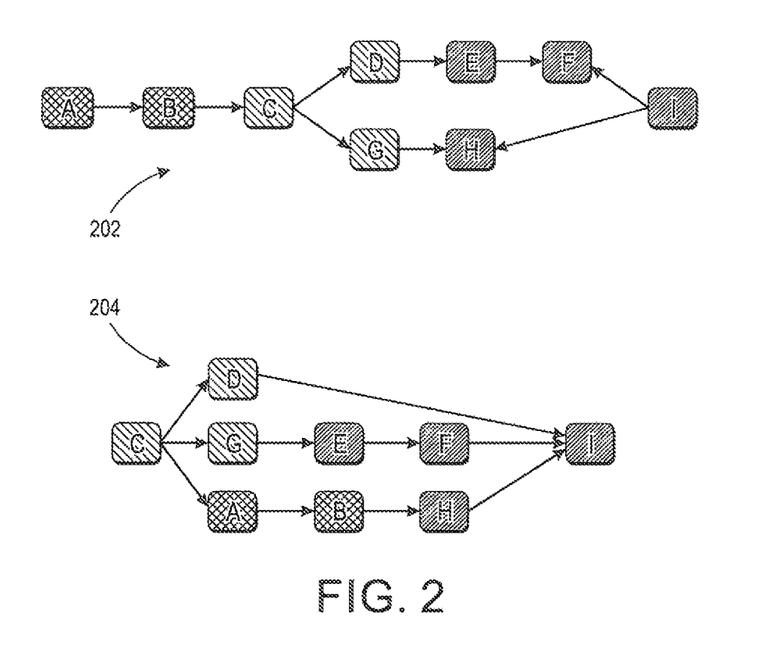
FIG. 2 is a schematic diagram of two example workflows.

FIG. 2 is a schematic diagram of two example workflows. Workflows 202 and 204 each include tasks labeled A, B, C, D, E, F, G, H, and I. Each of tasks A, B, C, D, E, F, G, H, and I represent activities that are part of workflows 202 and 204. Each arrow between any task in FIG. 2 represents an operation, e.g., a transition between tasks.

Although at first glance, workflow 202 and workflow 204 might appear unrelated, they both contain several identical partial workflows. For example, workflow 202 and workflow 204 both contain the same partial workflow path that includes tasks A and B and their intervening operation. As another example, workflow 202 and workflow 204 both contain the same partial workflow split that includes tasks C, D, and G and their intervening operations. As yet another example, both workflow 202 and workflow 204 contain the same partial workflows defined by the partial workflow path that includes tasks E and F and their intervening operation as well as the partial workflow merge defined by tasks F, H and I and their intervening operations. Thus, workflows 202, 204 include at least three of the same partial workflows. As detailed herein, some embodiments can match a given query partial workflow to a complete workflow that contains it.

Figure 3:
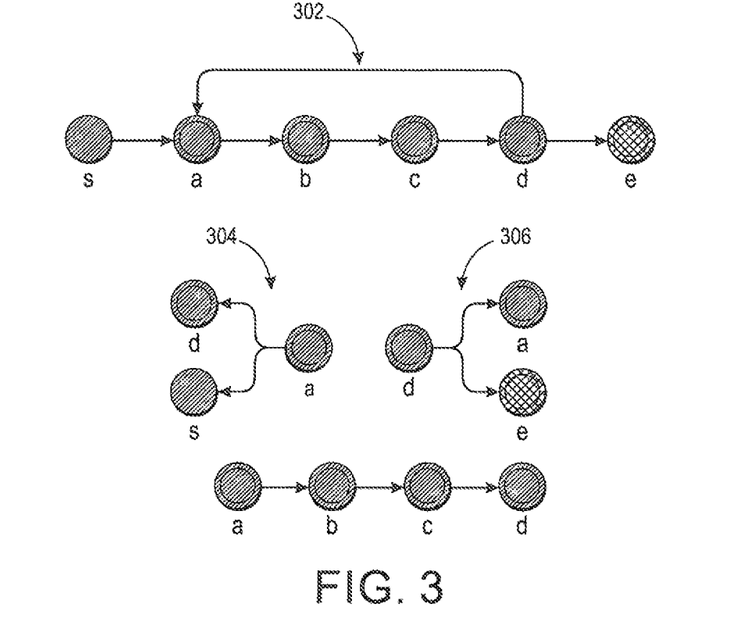
FIG. 3 is a schematic diagram of an example workflow and its components.

FIG. 3 is a schematic diagram of a workflow and a decomposition into its components. Workflow 302 includes tasks labeled A, B, C, and D. Workflow 302 also includes a start node, labeled S, and an end node, labeled E. Each of tasks A, B, C, and D represent activities that are part of workflow 302. Each arrow between any task in FIG. 3 represents an operation, e.g., a transition between tasks.

Workflow 302 includes several types of workflow components. Examples of a "workflow component" include the following types of partial workflows: splits, joins, and paths. For example, the sub-graph of workflow 302 that includes tasks A, D, and S and their intervening operations forms join component 304. As another example, the sub-graph of workflow 302 that includes tasks D, A, and E and their intervening operations forms split component 306. As yet another example, the sub-graph of workflow 302 that includes tasks A, B, C, and D together with their intervening operations form path component 308.

Figure 4:
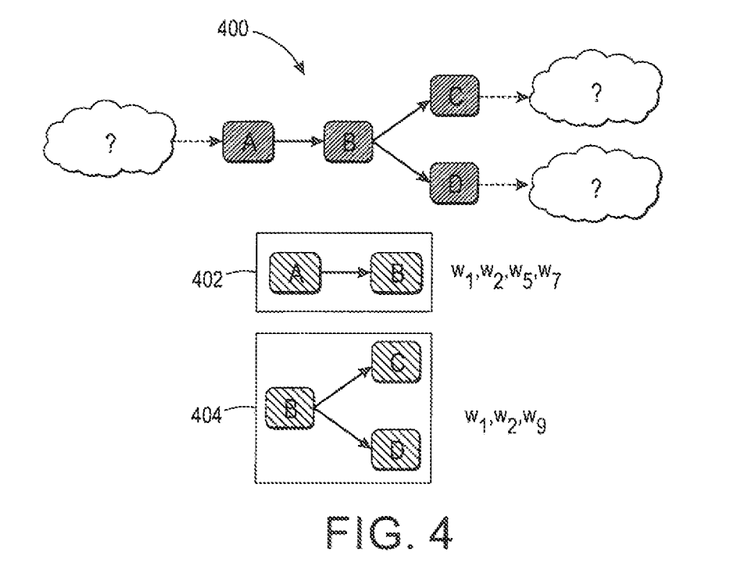
FIG. 4 is a schematic diagram of a component-based workflow filtering technique according to some embodiments.

FIG. 4 is a schematic diagram of a component-based workflow filtering technique according to some embodiments. In matching a query partial workflow to each of a set of workflows, eliminating from the full matching process the workflows that do not share any components in common with the query partial workflow can increase overall efficiency. For example query partial workflow 400 includes path component 402 defined by tasks A and B and their intervening operations, and split component 404 defined by tasks B, C, and D and their intervening operations. An initial comparison of components 402, 404 to each workflow in a set of workflows $w_1, w_2, \ldots, w_{10}$ might reveal that path component 402 is present only in workflows $w_1, w_2, w_5$, and $w_7$, and that split component 404 is present only in workflows $w_1, w_2$, and $w_9$. Accordingly, some embodiments perform this initial component detection, which is relatively computationally inexpensive, and then perform the full matching process only between query partial workflow 400 and the workflows that include at least one common component 402, 404, namely workflows $w_1, w_2, w_5, w_7$, and $w_9$. In other words, some embodiments pre-screen the set of workflows to retain for comparison only those workflows that include at least one component in common with the query workflow.

Figure 5:
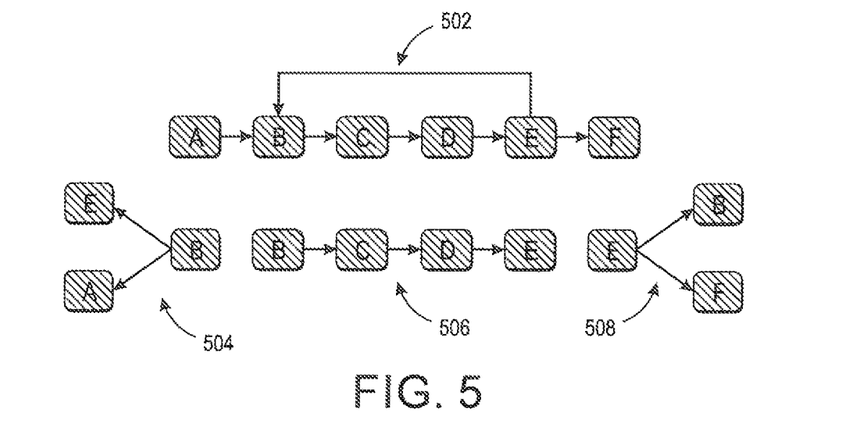
FIG. 5 is a schematic diagram of a workflow sequencing according to some embodiments.

FIG. 5 is a schematic diagram of a workflow sequencing according to some embodiments. The sequencing process aims to break up workflows into their components and organize the components into a linear sequence, or list. In some embodiments, this process is done in a manner such that the workflows can be reconstructed from their sequenced components. An example of this process is illustrated in FIG. 5 relative to workflow 502 defined by tasks A, B, C, D, E, and F and their intervening components. Thus, workflow 502 includes path component 506, merge component 504, and split component 508. Because each component includes sufficient information about its initial and terminal tasks, workflow 502 can be fully reconstructed with access to only components 504, 506, and 508.

Figure 6:
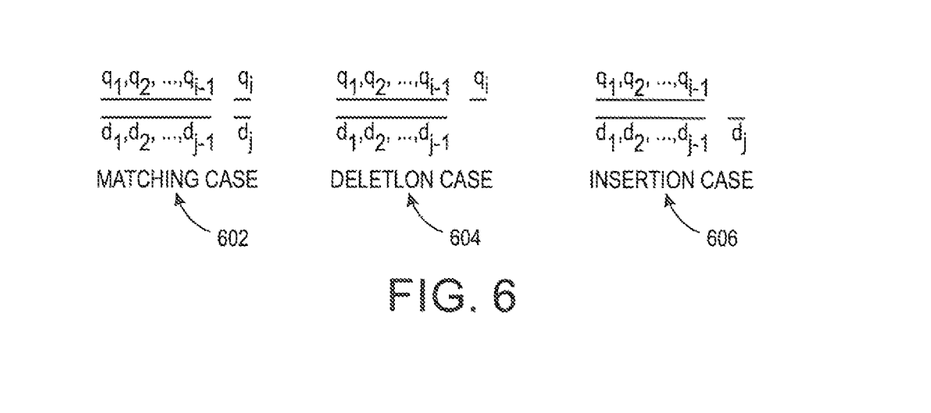
FIG. 6 is a schematic diagram of dynamic workflow matching according to some embodiments.

FIG. 6 is a schematic diagram of dynamic workflow matching according to some embodiments. In FIG. 6, the terms $q_1, q_2, q_3, \ldots$ represent components from a sequenced query partial workflow q, and the terms $d_1, d_2, d_3, \ldots$ represent components from a sequenced workflow d to which the query partial workflow is being matched. The matching process aims to assign a final score to the pair q, d. (This process is performed for each of a plurality of workflows, and the workflow(s) with the best score are deemed to match the query partial workflow best.) The score is assigned by recursion on the sequences $q_1, q_2, q_3, \ldots$ and $d_1, d_2, d_3, \ldots$. As a basis for the recursion, the potential scores are initially set to zero. Note that the matching is done component-by-component and can include skipping one or more components from either or both of q and d. Further, the matching is done so as to impose alignment between the sequences $q_1, q_2, q_3, \ldots$ and $d_1, d_2, d_3, \ldots$, adding gap "dummy" components where needed.

Thus, in FIG. 6, it is assumed, without loss of generality, that an initial set of components $q_1, q_2, q_3, \ldots q_{i-1}$ and $d_1, d_2, d_3, \ldots d_{j-1}$ have already been aligned and had potential scores assigned. There are three possible cases on how $q_i$ and $d_j$ can be aligned: matching case 602, deletion case 604, and insertion case 606. For matching case 602, $q_i$ can match $d_j$. This means that component $q_i$ and $d_j$ are similar (e.g. identical) to each-other. For both deletion case 604 and insertion case 606, $q_i$ does not match $d_j$. For deletion case 604, $q_i$ is determined to match a component later in the sequence of d than $d_j$. Thus, a gap component is imposed on the sequence for d so as to enforce alignment. For insertion case 606, $d_j$ is found to match a component from the sequence for q at some point after $q_i$. Thus, a gap component is imposed on the sequence for q so as to enforce alignment.

When attributing scores, matching case 602 results in a positive term being added to the recursively-produced potential score, whereas deletion case 604 and insertion case 606 result in negative terms being added.

The matching process is further explained as detailed below in reference to FIGS. 8 and 9.

Figure 7:
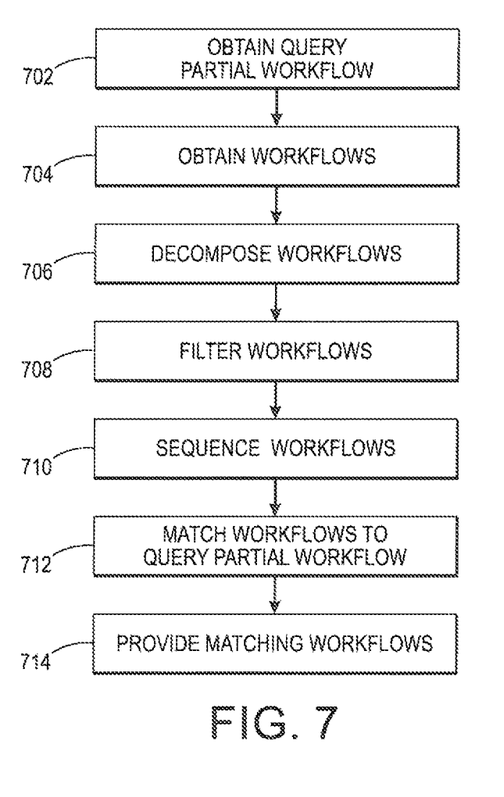
FIG. 7 is a flowchart of a partial workflow matching method according to some embodiments.

FIG. 7 is a flowchart of a partial workflow snatching method according to some embodiments. At block 702, the method obtains a query partial workflow. The method can obtain the query partial workflow by accessing a stored representation thereof from a persistent memory, for example. As another example, the method can obtain the query partial workflow by receiving an electronic representation of it, e.g., over a network such as the internet.

At block 704, the method obtains a set of workflows. The method can obtain the workflows by accessing stored representations of the workflows from a persistent memory, for example. As another example, the method can obtain the workflows by receiving electronic representations of them, e.g., over a network such as the internet.

At block 706, the method decomposes each workflow into components. In an example embodiment, the method decomposes each workflow, including the workflows obtained at block 704 and the partial query workflow obtained at block 702, into components, e.g., merge components, join components, and path components. The method can use known techniques for such decomposition. An example of such decomposition is discussed above in reference to FIG. 3.

At block 708, the method filters the workflows obtained at block 704 based on components in common with the components of the query workflow obtained at block 702 so as to obtain a filtered set of workflows. In some embodiments, only those workflows that share at least one component in common with the query partial workflow are retained for processing in subsequent steps. An example filtering technique is discussed above in reference to FIG. 4.

At block 710, the method sequences the query workflow and each workflow from the filtered set of workflows. The sequencing operation breaks up each workflow from the set of filtered workflows into a sequence of components so as to obtain a set of sequenced, filtered workflows. The sequencing may be done in a manner that permits each workflow to be reconstructed using only knowledge of the sequences workflow components of that workflow. An example sequencing technique is discussed above in detail in reference to FIG. 5.

At block 712, the technique matches each workflow from the set of sequenced, filtered workflows to the query workflow. The matching process produces a matrix of potential scores, including one potential score for each pair of components taken from, on the one hand, the query partial workflow, and, on the other hand, a workflow from the set of sequenced, filtered workflows. In addition, the potential scores include basis scores of zero corresponding to an initial basis score and scores of zero for each component from both the query partial workflow and a workflow from the set of sequenced, filtered workflows. Thus, for example, if the query partial workflow includes four components, and a workflow from the set of sequenced filtered workflows includes six components, then the technique of block 712 produces (4+1)×(6+1)=35 potential scores. The final score attributed to the query partial workflow and a given workflow is a maximum from the corresponding matrix of potential scores. (In some embodiments, lower scores indicate closer matching; in such embodiments, the final score is a minimum from the corresponding set of potential scores. In either embodiment, the final score is an extremum of the potential scores.) An example matching technique is discussed above in reference to FIG. 6 and below in reference to FIGS. 8 and 9.

At block 714, the method provides the matched workflow. The providing can include displaying a diagram of the matched workflow, displaying an identification of the matched workflow, or otherwise apprising a user of the system of the identity of the matched workflow. In addition to providing the matched workflow, the system can identify the portion of the matched workflow that best matches the query partial workflow. Techniques for such identification are discussed below in reference to FIG. 9.

Figure 8:
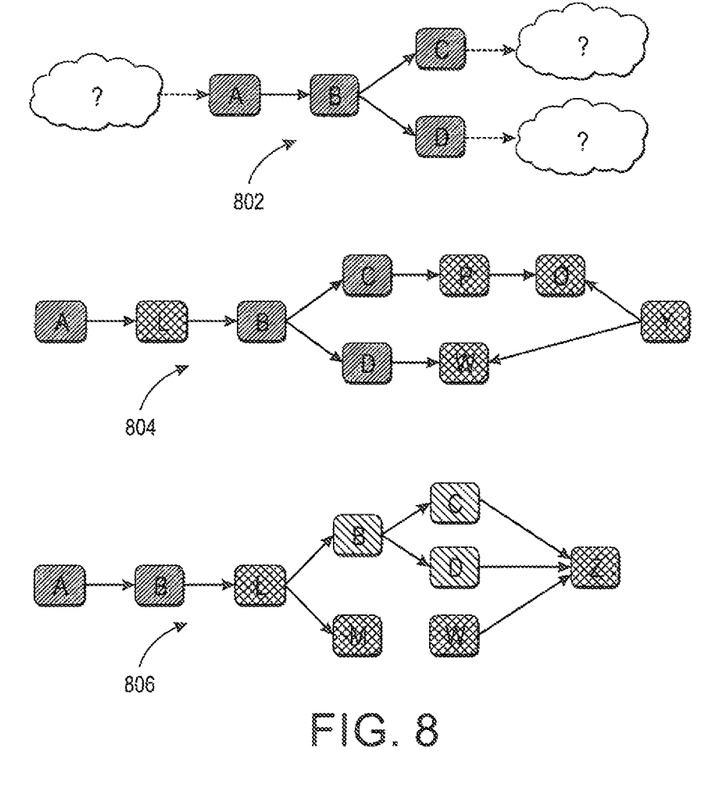
FIG. 8 is a schematic diagram of a partial workflow and two complete workflows to which the partial workflow is to be matched.

FIG. 8 is a schematic diagram of partial workflow 802 and two complete workflows 804, 806 to which the partial workflow is to be matched. In particular, partial workflow 802 is matched to each of the two complete workflows 804, 806 as discussed in detail below in reference to FIG. 9.

Figure 9:
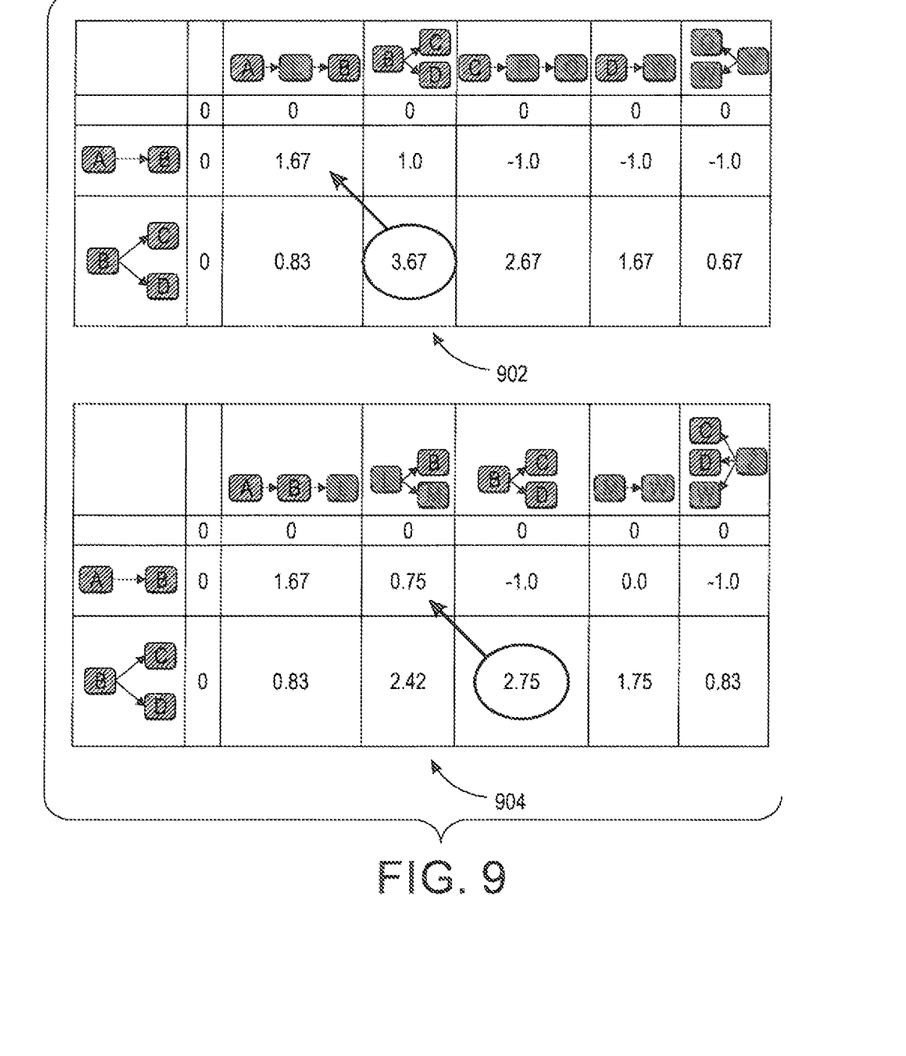
FIG. 9 is a schematic diagram of example processing steps applied to the partial and complete workflows of FIG. 8 according to some embodiments.

FIG. 9 is a schematic diagram of example processing steps applied to the partial and complete workflows of FIG. 8 according to some embodiments. Thus, FIG. 9 depicts two scoring matrices 902, 904 corresponding to example matchings between query partial workflow 802 and workflows 804, 806 respectively. Each matrix 902, 904 depicts components from sequenced query partial workflow 802 along their vertical left-hand sides. Matrix 902 depicts components from sequenced workflow 804 along its top horizontal side, and matrix 904 depicts components from sequenced workflow 806 along its top horizontal side. Each of matrices 902, 904 also depicts basis scores of zero along their respective top rows and left-hand side columns.

In computing the potential scores depicted in matrices 902, 904 recursively, the following non-limiting example matching function is used.

$$T(i, j) = \max \begin{cases} T(i-1, j-1) + \delta(q_i, d_j) \\ T(i-1, j) + \tau(q_i) \\ T(i, j-1) + \tau(d_j) \\ 0 \end{cases} \quad (1)$$

In the above matching function, $T(i, j)$ represents the potential score for row i and column j in a corresponding scoring matrix (where rows and columns are numbered as 0, 1, 2, 3, . . . ). The function $\tau(\bullet, \bullet)$ represents a penalty score corresponding to insertion and deletion cases. In some embodiments, such as that depicted in reference to FIG. 9, $\tau(\bullet, \bullet)$ is set to a constant of −1.

The function $\delta(\bullet, \bullet)$ represents a similarity score for a pair of individual components. An example similarity score, such as that depicted in reference to FIG. 9, can be computed as follows. Each root task in a split or merge component is assigned a value of 0.5, and the remaining tasks in the same component evenly split the remaining 0.5. (A "root task" of a component is the task from which other tasks in the component split off from or join into.) Each task in a path component is assigned a value of one divided by a number of tasks in the path component. Thus, for this example, the sum of values for each task in a given component is one. Now, given two components $C_1$ and $C_2$, the value of $\delta(C_1, C_2)$ is the sum of values assigned to tasks in common between $C_1$ and $C_2$, including duplicates. Thus, for example, for a split component denoted $C_1$=[A→B, C] and a path component denoted $C_2$= [A→X→C], the value of $\delta(C_1, C_2)$ in this scheme is $½+⅓+¼+⅓=17/12≈1.41$. In this computation, the ½ corresponds to the common A from $C_1$, the first ⅓ corresponds to the common A from $C_2$, the ¼ corresponds to the common B from $C_1$, and the second ⅓ corresponds to the common B from $C_2$. Note that in this example scoring scheme, scores for any pair of components range from zero to two, inclusive.

Turning to matrix 902, note first that the potential scores along the top row and left-hand column are set to zero as a basis. To compute a matching score $T(1, 1)$ for the first non-zero cell in the upper left of matrix 902, the maximum is taken between the four terms depicted in the matching function above. The first term, $T(i−1, j−1)+\delta(q_i, d_j)$, where i=j=1 is given as zero plus the value of $\delta$ applied to components [A→L→B] and [A→B], namely, approximately 1.67. The second and third terms are both determined as negative one, and the fourth term is zero. Thus, the maximum of these terms is $T(1, 1)=1.67$.

To computer a matching score for the third cell over and the third cell down, i.e., $T(2, 2)$, the maximum is again taken from the four terms in the matching function. The first term is 1.67 plus the similarity score for components [B→C, D] and [B→C, D], which is two, for a total sum of 3.67. The second term is $1+\tau(1, 2)=0$, the third term is $1+\tau(2, 1)=0.83−1=−0.17$, and the fourth term is zero. Thus, the maximum of these terms is $T(2, 2)=3.67$.

The remaining potential scores in matrix 902 are determined as discussed above, that is, in a similar manner to that of the two example score determinations for $T(1, 1)$ and $T(2, 2)$.

Turning now to matrix 904, example computations for $T(1, 2)$ and $T(2, 3)$ are provided. For $T(1, 2)$, the maximum of the four terms that define T is again assigned. The first term is $T(0, 1)+\delta([A→B], [L→B, M])=0+¾=0.75$. The second term is $T(0, 2)+\tau(0, 2)=0−1=−1$. The third term is $T(1, 1)+\tau(1, 1)=1.67−1=0.67$. The fourth term is zero. Thus, the maximum of these four terms is 0.75.

To compute a potential matching score for the third row down and the fourth column over for matrix 904, i.e., $T(2, 3)$, again the maximum of the four terms in the matching score is taken. Here, the first term is $T(1, 2)+\delta([B→C, D], [B→C, D])=0.75+2=2.75$.

The remaining potential scares in matrix 904 are determined as discussed above, that is, in a similar manner to that of the two example score determinations for T(1, 2) and T(2, 3).

Now, the maximum potential score in matrix 902 is 3.67, and the maximum potential score for matrix 904 is 2.75. Thus, because 3.67 is greater than 2.75, the conclusion is that the workflow corresponding to matrix 902, i.e., workflow 804, better matches query partial workflow 802 than does the workflow corresponding to matrix 904, i.e., workflow 806. That is, between workflows 804 and 806, workflow 804 is the best match for query partial workflow 802.

Matrices determined as discussed herein can be used to precisely identify the portion of the workflow that best matches the partial query workflow. In the example discussed in reference to FIG. 9, matrix 902 provides path information about which part of workflow 804 matches query partial workflow 802. In particular, the maximum potential score of 3.67 arose from the diagonal score of 1.67. This indicates that the corresponding components from workflow 804 as appearing on the top row of matrix 902 best match query partial workflow 802. Similarly, if potential score 2.75 from matrix 902 were the maximal score from among the workflows, because it arose from the diagonal cell in matrix 904, the corresponding components from workflow 806 would best match query partial matrix 802. Nevertheless, these components best match query partial workflow 802 from among the components of workflow 806, if not from among other workflows including workflow 804.

To identify the portion of the compared workflows that best match the query partial workflow, at least two approaches can be implemented. In the first approach, once the maximal potential score is identified, the method traces back the cells from which it arose. Such cells define the corresponding workflow components that best match the query partial workflow. For the second approach, when computing each potential score, the method stores information identifying the cell from which each potential score arose. Once the maximal potential score is identified, the stored information is used to identify the components that best match the query partial workflow. The first approach is more computation intensive, but utilizes less memory, whereas the second approach is less computation intensive, but uses more memory. Either approach may be used, or a hybrid of such approaches.

Certain embodiments can be performed as a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A computer implemented method of detecting and removing duplicative real-world tasks in an enterprise by matching a query partial workflow modeling the real-world tasks to at least one of a plurality of workflows, the method comprising:
   obtaining the query partial workflow representing a plurality of real-world tasks and a plurality of operations;
   modeling enterprise tasks by the plurality of workflows, each workflow of the plurality of workflows representing a plurality of real-world tasks and a plurality of operations;
   decomposing each of the plurality of workflows into a plurality of components, each component representing a plurality of real-world tasks, whereby a plurality of decomposed workflows are obtained;
   filtering the plurality of workflows based on the decomposed workflows and a decomposition of the query partial workflow, whereby a plurality of filtered workflows are obtained;
   sequencing the plurality of filtered workflows, whereby a plurality of sequenced filtered workflows are obtained;
   matching the query partial workflow to each of the plurality of sequenced filtered workflows, each matching based on a corresponding plurality of recursively determined scores, whereby scores for each of the plurality of sequenced filtered workflows are obtained;
   identifying, from among the plurality of workflows, a matched workflow corresponding to an extremum among the scores for each of the plurality of sequenced filtered workflows;
   identifying redundant real-world tasks represented by the matched workflow; and
   removing the redundant real-world tasks from being performed.

2. The method of claim 1, wherein the plurality of components comprise split components, merge components, and path components.

3. The method of claim 1, further comprising recommending a pre-existing partial workflow based on the identifying.

4. The method of claim 1, wherein the filtering comprises removing from consideration workflows from the plurality of workflows that do not include at least one component of the decomposition of the query partial workflow.

5. The method of claim 1, wherein each matching comprises generating a matrix comprising the corresponding plurality of recursively determined scores.

6. The method of claim 5, wherein each matrix further comprises path information for each of the recursively determined scores.

7. The method of claim 6, further comprising identifying, based on path information, a partial workflow of the matched workflow that matches the query partial workflow.

8. The method of claim 5, further comprises backtracking recursively determined scores from the extremum among the scores.

9. The method of 8, further comprising identifying, based on backtracking, a partial workflow of the matched workflow that matches the query partial workflow.

10. A system for detecting and removing duplicative real-world tasks in an enterprise by matching a query partial workflow modeling the real-world tasks to at least one of a plurality of workflows, the system comprising:

a memory storing the query partial workflow representing a plurality of real-world tasks and a plurality of operations;

a memory storing the plurality of workflows modeling enterprise tasks, each workflow of the plurality of workflows representing a plurality of real-world tasks and a plurality of operations;

at least one processor configured to decompose each of the plurality of workflows into a plurality of components, each component representing a plurality of real-world tasks, whereby a plurality of decomposed workflows are obtained;

at least one processor configured to filter the plurality of workflows based on the decomposed workflows and a decomposition of the query partial workflow, whereby a plurality of filtered workflows are obtained;

at least one processor configured to sequence the plurality of filtered workflows, whereby a plurality of sequenced filtered workflows are obtained;

at least one processor configured to match the query partial workflow to each of the plurality of sequenced filtered workflows, each matching based on a corresponding plurality of recursively determined scores, whereby scores for each of the plurality of sequenced filtered workflows are obtained;

at least one processor configured to identify, from among the plurality of workflows, a matched workflow corresponding to an extremum among the scores for each of the plurality of sequenced filtered workflows; and at least one processor configured to identify redundant real-world tasks represented by the matched workflow.

11. The system of claim 10, wherein the plurality of components comprise split components, merge components, and path components.

12. The system of claim 10, further comprising at least one processor configured to recommend a pre-existing partial workflow based on the matched workflow.

13. The system of claim 10, wherein the at least one processor configured to filter is further configured to remove from consideration workflows from the plurality of workflows that do not include at least one component of the decomposition of the query partial workflow.

14. The system of claim 10, further comprising at least one processor configured to generate a matrix comprising the corresponding plurality of recursively determined scores.

15. The system of claim 14, further comprising a memory configured to store a representation of each matrix including path information for each of the recursively determined scores.

16. The system of claim 15, further comprising at least one processor configured to identify, based on path information, a partial workflow of the matched workflow that matches the query partial workflow.

17. The system of claim 14, further comprising at least one processor configured to backtrack recursively determined scores from the extremum among the scores.

18. The system of 17, further comprising at least one processor configured to identify, based on backtracking, a partial workflow of the matched workflow that matches the query partial workflow.

* * * * *